United States Patent

Le Nouveau et al.

[11] Patent Number: 6,099,925
[45] Date of Patent: Aug. 8, 2000

[54] FLEXIBLE DUCT WITH A TEXTILE REINFORCEMENT

[75] Inventors: Joël Le Nouveau, Yainville; Anh Tuan Do, Cormeilles en Parisis, both of France

[73] Assignee: Coflexip, Paris, France

[21] Appl. No.: 09/043,976

[22] PCT Filed: Sep. 25, 1996

[86] PCT No.: PCT/FR96/01493

§ 371 Date: Mar. 30, 1998

§ 102(e) Date: Mar. 30, 1998

[87] PCT Pub. No.: WO97/13091

PCT Pub. Date: Apr. 10, 1997

[30] Foreign Application Priority Data

Oct. 4, 1995 [FR] France ................................. 95 11675

[51] Int. Cl.[7] ....................................................... B32B 1/08
[52] U.S. Cl. ........................ 428/36.9; 428/35.8; 428/36.1; 428/36.2; 428/36.91; 138/124; 138/125; 138/129; 138/172
[58] Field of Search .................... 428/36.1, 34.1, 428/34.5, 34.6, 35.8, 474.4, 36.91, 480, 36.9, 515, 36.2; 138/123–127, 129, 132, 172, 174

[56] References Cited

U.S. PATENT DOCUMENTS 4,104,095  8/1978  Shaw ........................................... 156/83

FOREIGN PATENT DOCUMENTS

| 0071188 | 2/1983 | European Pat. Off. . |
| 0074747 | 3/1983 | European Pat. Off. . |
| 0439898 | 8/1991 | European Pat. Off. . |
| 2699979 | 7/1994 | France . |
| 3907785 | 9/1990 | Germany . |
| 92/01885 | 2/1992 | WIPO . |

Primary Examiner—William Krynski
Assistant Examiner—Chris Cronin
Attorney, Agent, or Firm—Ostrolenk, Faber, Gerb & Soffen, LLP

[57] ABSTRACT

A duct comprising a sealed inner tube (1) and a reinforcement (2) made of at least one strip wound in a spiral around a central axis (11) of the inner tube. The strip (10) is flat and includes at least one layer of longitudinal filamentary rovings (6) and means for assembling said filamentary rovings comprising a loosely woven weft yarn (7) and a bonding material (8) provided at least at the interface between said filamentary rovings and said weft yarn. The assembly means hold the longitudinal rovings together along the full length thereof and impart a compactness of at least 39% to said strip.

20 Claims, 1 Drawing Sheet

FLEXIBLE DUCT WITH A TEXTILE REINFORCEMENT

FIELD OF THE INVENTION

The present invention relates to a flexible pipe or duct having a textile reinforcement and, more particularly, to a flexible pipe for conveying a fluid under high pressure, the inside diameter of the said pipe being greater than approximately 4 cm.

Such pipes are used, for example, for conveying gas, crude oil, water or other fluids over long distances and under pressures of several hundred bars.

The structure of these pipes, in its simplest form, comprises at least:

- an inner leakproofing tube, in which the fluid circulates,
- a reinforcement which is arranged around the said inner tube and the function of which is to resist the pressure prevailing inside the inner tube and the various external forces,
- and, if appropriate, an outer protective and/or leakproofing sheath arranged around the reinforcement.

The improvements and other refinements made to the pipes of this type relate generally, but not exclusively, to the reinforcement.

RELATED ART

In a known embodiment, the reinforcement is produced by plaiting filamentary slivers around an inner leakproofing tube made of synthetic material. Such a reinforcing technique has disadvantages, in particular that of limiting the inside diameter of the inner leakproofing tube to values below 4 cm, which considerably restricts the use of the flexible pipe. In fact, beyond 4 cm, the means to be employed for producing the appropriate plaits are prohibitive, since they involve a great number of large reels of filamentary slivers and handling members which are considerable in view of the weight of the reels. With the means currently available, it is very difficult, if not impossible, to produce a closely packed reinforcement which covers the inner leakproofing tube perfectly over very great lengths (for example, greater than 1 km for an inside diameter of 5 cm). Now a closely packed reinforcement or a complete covering of the inner tube is necessary in order to achieve a high resistance of the flexible pipe. It is preferred to have a closely packed reinforcement or a good covering rate of the inner tube, hence resistance to internal pressure, the only solution is to reduce the length of the pipes obtained continuously. The result of this is that, in order to convey fluids over long distances, it becomes necessary to connect a plurality of pipes end to end by means of connection pieces, the disadvantage of this being that it involves a high outlay and gives rise to zones of weakness in the pipe in term of leakproofing.

Moreover, carrying out very closely packed plaiting slows down the pipe production rates appreciably.

Finally, plaiting of filamentary slivers involves a great number of interlacings of the filamentary slivers, the result of which is a low output which is reduced all the more because the number of superposed plaited layers is high since it was noticed that the layers furthest away from the (central) longitudinal axis of the inner tube contributed less than the others to the resistance to the pressure exerted on the inner wall of the inner tube.

In another embodiment, the reinforcement consists of one or more pairs of crossed laps, each lap being produced by means of a spiral winding of large slivers, such as cords or strands of substantially circular cross-section, the turns being more or less contiguous. The disadvantage of this technique is that it gives rise to a phenomenon of rotation of the inner tube when it is under pressure, the reinforcing slivers having unequal elongations from one lap to the other. Now such a phenomenon may damage the inner tube and reduce the effectiveness of the flexible pipe.

The U.S. Pat. No. 4,104,095 describes a flexible pipe having an internal plastic tube on which is wound a tape made of glass web the assembly being then heated in order that an intimate bond between the plastic sheath and the glass web is made by superficial melting of the sheath and displacement into the free spaces of the glass web, whereby a called "bonded" pipe is obtained.

The patent EP 539 429 relates to a composite pipe, in which a fluid under high pressure can circulate. The pipe comprises an inner tube made of thermoplastic, one or more layer of a band-like material wound around an inner tube, and an outer protective sheath. The band may be made of fibrous material impregnated or not with plastic, if appropriate reinforced by a cloth woven with fibres or metal. In one embodiment, the turns of the first layer are not contiguous, and the space between turns is covered by the layer or by the consecutive layers arranged above the said first layer, each of the layers being connected to the adjacent layer by the welding of its ends, the first layer being itself connectable to the inner tube. In one embodiment, the turns of each winding are contiguous, and they are connected by means of weld spots on the adjacent edges of the turns.

Such a pipe may seem satisfactory, but, in actual fact, this is not the case at all. Indeed, if the flexible pipe comprises only one winding band, only the second embodiment can be put to use. The latter has the major disadvantage of corresponding to a rigid tube, not a flexible one, in that the reinforcing bands do not have the possibility of being displaced as a function of the possible curvature of the pipe.

The main disadvantage of the first embodiment is that it requires at least three superposed layers, at least two of which have to be wound in the same direction, so as to make it possible to cover the spaces between the non-contiguous turns of the lower layer.

Finally, above all, this being true of both embodiments, no indication and/or suggestion is given as to the structure of the band, except that it is of a fibrous nature impregnated or not with plastic, and that it can be reinforced. In conclusion, this patent neither teaches nor suggests how to produce an optimized flexible pipe, that is to say a pipe having a best resistance/cost ratio, whilst at the same time controlling the abovementioned rotation effects.

In fact, strictly from an industrial and economic viewpoint, the two terms of the resistance/cost ratio are not in accord with one another. In the prior art and hitherto, the increase in resistance has been achieved at the expense of cost. Thus, for example, more and more resistant, but also very expensive fibres have been used, such as carbon fibres, aromatic polyamides, etc., without any thought as to their technical and economic efficiency. At the present time, attempts are still being made to manufacture a flexible pipe which has the required qualities, but at less cost.

SUMMARY OF THE INVENTION

This is the problem solved by the present invention, the object of which is to provide a flexible pipe optimized both in terms of resistance to the internal pressure and the external forces, especially tensile forces, and in economic terms, in particular the pipe being of large diameter and of great length.

Another object is to provide a flexible pipe, in which the materials used for producing it and/or the sub-components, such as the reinforcing band, themselves have the best resistance/cost ratio.

Another object of the present invention is to permit easier industrial manufacture of the flexible pipe by the existing means or techniques, without resorting to sophisticated or specific techniques and without appreciably reducing the production rates.

The subject of the present invention is a flexible pipe of the type comprising at least:

a leakproof inner tube, a reinforcement comprising at least one band wound spirally around a central axis of the said inner tube, characterized in that the band is flat and comprises at least one layer of longitudinal filamentary slivers and means for assembling the said filamentary slivers, comprising a loose woven weft and binding material arranged at least at the interface of the said filamentary slivers and of the said weft, the said assembly means being designed so as to keep the longitudinal slivers closely packed against one another over their entire length and to impart a compactness at least equal to 39% to the said band.

By virtue of these arrangements, the flexible pipe is optimized both in terms of resistance to internal pressure and in economic terms or, in other words, in that it has the best resistance/price ratio.

It easily meets criteria for use due to the fact that it employs the technique of reinforcement by means of a spiral winding; it may be manufactured in a large diameter with a good covering rate and over a great length, without any appreciable reduction in the production rates.

Furthermore, it makes use of a band, as sub-component, which advantageously has an optimized resistance/cost ratio.

For reasons of convenience and simplicity, the binding material is introduced at the said interface by the use of weft threads which are sheathed with thermoplastic prior to weaving.

According to another characteristic of the invention, to improve the cohesion of the slivers in the band and its stability and to achieve better protection of the longitudinal slivers against any risk of abrasion or chemical attack, slivers which are sheathed with thermoplastic prior to the weaving of the weft thread are used.

BRIEF DESCRIPTION OF THE DRAWINGS

Other advantages and characteristics will emerge more clearly from reading the description of several preferred embodiments of the invention and from the accompanying drawings in which.

DETAILED DESCRIPTION

Figure 1:
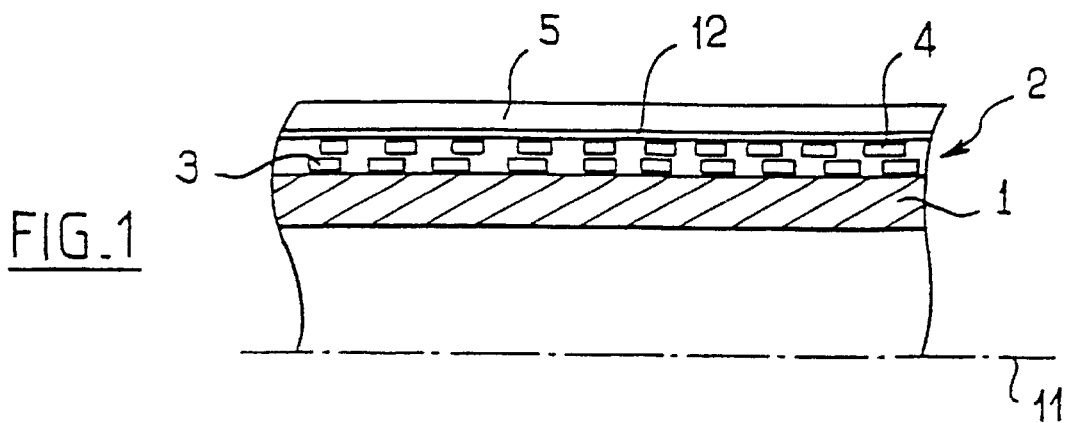
FIG. 1 is a partial diagrammatic sectional view of a flexible pipe according to the invention.

In the exemplary embodiment of the pipe according to the invention illustrated in FIG. 1, the latter comprises from the inside outwards:

a leakproofing inner tube 1 for conveying a fluid under pressure, for example made of thermoplastic, in this particular case of high-density polyethylene conforming to the standard NFT-54-065, the inside and outside diameters of which are 73.6 mm and 90 mm respectively;

a reinforcement 2 consisting of two laps 3 and 4 comprising a plurality of bands, typically called reinforcing bands, wound spirally around the inner leakproofing tube 1 and in opposite directions at an angle of approximately 55°; and an outer layer 5 consisting of a protective sheath, for example produced from a thermoplastic, such as polyethylene, and having a thickness of approximately 4 mm.

According to a preferred embodiment of the present invention, the reinforcing comprising the laps 3 and 4 consists of a flat band 10 comprising longitudinal warp threads 6, forming a layer 6' of longitudinal filamentary slivers, and means for assembling the said warp threads, comprising weft threads 7 and binding material 8. The assembly means are designed so as to keep the warp threads closely packed against one another over their entire length, at the same time imparting some compactness, as defined below, to the band at rest.

Figure 2:
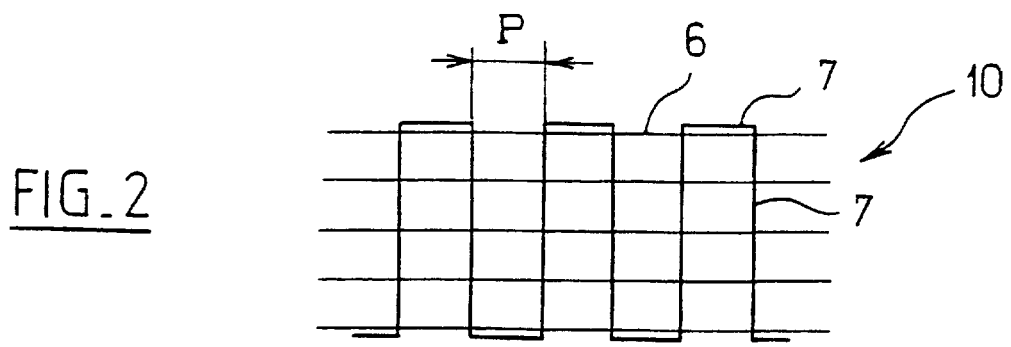
FIG. 2 is a partial plan view of the woven band used for forming the reinforcement of the flexible pipe according to the present invention.

In the example (FIG. 2), the weft assembles the warp threads by loose weaving, that is to say with a pitch P between two successive passes which is clearly greater than the value conventionally used, preferably greater than 5 times the diameter of the weft thread. Good results have been obtained with a pitch equal to approximately 0.5 cm. By virtue of this arrangement, the slivers have good dimensional stability, particularly in the direction of width, and their weakening is minimized. It is recalled, in this respect, that weakening expresses as a percentage a loss of strength of the slivers when they are assembled in relation to the strength of the sliver taken individually.

The longitudinal warp thread 6 is preferably a high-strength filamentary sliver, for example made from aromatic polyamide fibres, such as aramide fibres, or from carbon, glass, etc., fibres. In the example illustrated, the fibres are aramide fibres of 330 tex and, more specifically, continuous aramide filaments grouped together by twisting.

The weft is considered, within the meaning of the invention, as any element based on threads arranged transversely to the slivers in respect of the longitudinal direction of the band, obliquely or perpendicularly, so as to keep them closely packed against one another, the woven weft being a practical embodiment. The weft is arranged so as to interlace the longitudinal slivers by taking them up at least one by one and by passing through the layer 6'.

The weft thread 7 may be a thread of 44 tex made from aromatic polyamide fibres, a thread of 56 tex made from polyester fibres or a thread of 70 tex made from glass fibres, although other materials and other linear densities may be appropriate. Preferably, the diameter of the weft thread 7 is substantially equal to approximately one third of the diameter of the warp thread 6.

Figure 3:
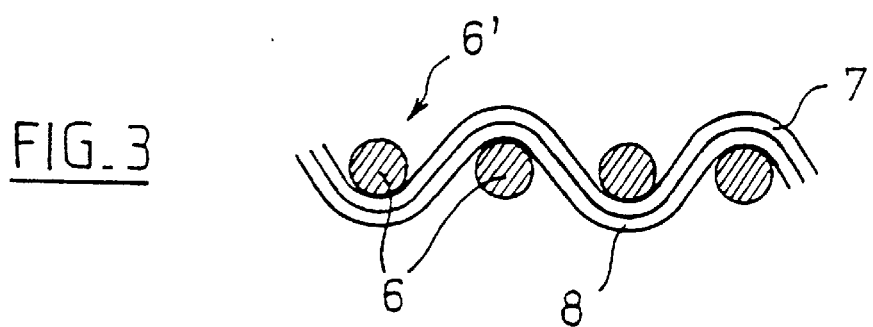
FIG. 3 is a partial sectional view of the band of FIG. 2 according to one embodiment.

According to the invention, a binding material 8 is arranged at least at the interface between the longitudinal slivers 6 and the weft threads 7. In a preferred embodiment, FIG. 3, the weft thread 7 is sheathed with a thermoplastic sheath which, after the band has been shaped, adheres firmly to the longitudinal slivers 6, in such a way that the band is not perforated, no play or air space existing between the said longitudinal slivers 6. If the slivers are very closely packed, they may overlap one another in places, instead of being side by side in a row. They overlap one another particularly in the region of each woven weft and cease to overlap one another in a zone located mid-way between two consecutive wefts.

The binding material is selected from the materials capable of binding the slivers directly or indirectly by physical and/or chemical adhesion and of following their deformation, particularly in terms of elongation. It was found that materials having a hardness of up to approximately 60 shore D were suitable in a band comprising bunched aramide slivers.

The binding material may be selected from thermoplastics, such as polyamides, polyolefins, vinyls, fluorinates, especially thermoplastic copolymers and elastomeric thermoplastics, or from elastomers, such as natural or synthetic rubber, polyurethane, silicone. Duroplastics, such as PTFE, and some polyurethanes may likewise be considered, on condition, however, that they are used in a small proportion, so as to preserve flexibility in the band.

Preference is given to thermoplastics on account of the ease with which they are used in the manufacture of the band.

Figure 4:
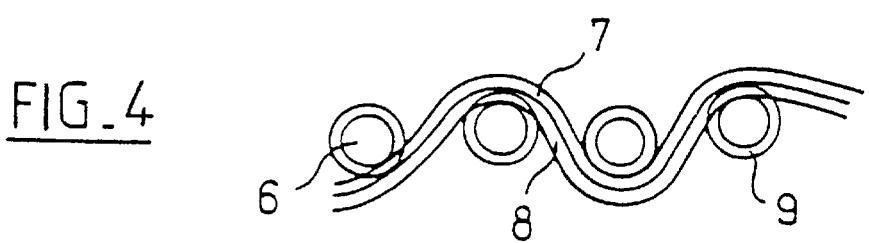
FIG. 4 is a partial sectional view of the band of FIG. 2 according to another embodiment.

In another embodiment, the warp threads or filamentary slivers 6 are each arranged in a thermoplastic sheath 9, as illustrated in FIG. 4, the weft threads 7 likewise being sheathed by the binding material 8. It can be seen, advantageously, that the sheathing of the longitudinal slivers improves their individual compactness in the band, in particular the latter being at rest.

In another embodiment (not shown), the warp threads are sheathed with thermoplastic, whilst the weft thread or weft threads are not. The result of this is that the weft itself is stabilized in spite of its loose pitch; on the other hand, this makes it possible to avoid an operation of sheathing the weft by means of a thermoplastic.

After weaving, the band is hot-calendered.

It is considered that the band is likely to be suitable for the invention when it has, at rest, a ratio of fibres or compactness greater than 39%. This ratio corresponds to the ratio of a band consisting of n aramide slivers, for example 11, of 330 tex and of a diameter at rest equal to 0.765 mm, on the assumption that, in this state, the slivers have a compactness of approximately 50%, the slivers being side by side in the same plane, that is to say contiguous. Preferably, the band must have a weakening below 10%.

In the example, the flat band comprises 11 longitudinal slivers 6 made of aromatic polyamide fibres, each sliver being of 330 tex, and a weft made of polyester fibres of 56 tex, sheathed with copolyamide at a pitch of 0.5 cm. The tensile strength of the band is of the order of 191 cN/tex (695 daN), with an elongation at break of the order of 3.7% and a weakening equal to 6%.

The band thus produced has a width filling corresponding to 4537.5 tex/cm or, according to a different criterion in terms of compactness, to a ratio of fibres in the band equal to 53%. This ratio is equal to s/S, s being the transverse area occupied by the fibres and S being the area of the rectangle enveloping the crosssection of the band.

The area of the rectangle enveloping the crosssection of the band is determined by considering its dimensions when it is at rest.

Its thickness may be measured, for example, by taking the distance separating two plates placed below and above the band, with a pressure exerted on the band lower than 10 g/cm$^2$. Its width may be measured when it is under this pressure.

As regards the area occupied by the fibres, this can be determined by considering the linear density of the longitudinal slivers and the density of the fibre forming each sliver.

In the example, the measured width is equal to 8 mm and its thickness is equal to 0.6 mm. The area s equal to 0.254 mm$^2$ was obtained by considering the density of the slivers as equal to 1440 kg/M$^3$.

If the longitudinal slivers are sheathed with binding material, the proportion of the latter is determined by carrying out a micrographic section and an image analysis, for example with the aid of "Photoshop" and "Optilab" equipment. The other components may, where appropriate, be determined in an identical way.

Since the woven band is hot-calendered, and if the longitudinal slivers 6 are sheathed with thermoplastic, it is recommended to keep air between the fibres of the slivers, so as to preserve good flexibility or suppleness in the band, for example by maintaining a ratio of air in each sliver equal to approximately 23% and of the order of 16% in relation to the area of the actual cross-section of the band. In the example (FIG. 4), the ratio of binding material in the band is 33%.

In general terms, it was found that the proportions of the various components of the band at rest which are likely to be appropriate may be selected in the following way.

If the longitudinal slivers are not sheathed with thermoplastic, each sliver comprises at least 50% of fibres, whilst, in terms of the enveloping rectangle, the ratio of fibres in the band is greater than or equal to 39%. In this case, the quantity of binding material in the band corresponds to the quantity of material necessary for sheathing the weft.

If the longitudinal slivers are sheathed with thermoplastic, it is expedient to measure the respective proportions of the components by image analysis in terms of the area actually occupied by the cross-section of the band and not in terms of the cross-section of the enveloping rectangle, the purpose of this being to have more representative proportions. The proportions likely to be appropriate are then :

Fibres in each sliver: 60% to 90%

Fibres in the band greater than approximately 50%

Binding material: 5 to 40%, preferably 20 to 35%

Air in the sliver from 5 to 40%, preferably 10% to 30%.

In the embodiment illustrated in FIG. 1, the reinforcement 2 comprises two superposed reinforcing laps 3, 1, each comprising a plurality of reinforcing bands 10, the bands of the first lap 3 being wound, for example, at an angle of between 54 and 56° relative to the axis 11 of the flexible pipe, whilst those of the second lap 4 are wound in the opposite direction. For example, the reinforcing angle of one lap may be below 55° and the reinforcing angle of the other lap greater than 55°. By means of such a reinforcing angle, the elongation of the said flexible pipe is kept at a low level. In general terms, it was found that the band must satisfy the following conditions in order to fulfill the objectives of the invention. It must have, mainly, high compactness, good dimensional stability, equal tension of all the slivers, when it is stressed by bearing on a curved surface, and low weakening. Since the band is wound under tension during reinforcement, its compactness becomes greater than its compactness at rest. The ratio of fibres within each sliver may approach a theoretical maximum ratio of 90%. The pipe according to the invention thus has the advantage of minimizing the phenomenon of rotation which is likely to damage it.

According to another characteristic of the invention, a mould-stripping or anti-adhesion band 12 is wound around the reinforcement 2, with covering around the second reinforcing lap 4, so as to cover the said reinforcement completely in order to separate it from the outer protective sheath in the flexible pipe. Thus, the outer protective sheath is not capable of impregnating the reinforcing bands 10, so that the flexible pipe obtained is of the "non-bonded" type according to the API (American Petroleum Institute) designation. The anti-adhesion band may be produced from MYLAR, TERPHANE or from a Teflon-coated sheet of a thickness of between 0.5 and 2 mm, and preferably between 0.75 and 1.5 mm.

A flexible pipe according to the embodiment described above, having an inside diameter equal to 5 cm (2 inches), has a linear weight of 3.61 kg/m and a bursting pressure P of the order of 254 bar. In economic terms, it is apparent that the quantity of fibres Q necessary per linear metre of pipe is of the order of 180 g, thus giving a quantity of fibres Q per metre of pipe and per unit of bursting pressure Q/P approximately equal to 0.7 g/m.bar (=180/254).

Tests conducted on flexible pipes of greater diameter, for example with an inside diameter of 152.4 mm (6 inches) and an outside diameter of 187 mm, show that the flexible pipe obtained has a weight of 8.58 kg/m, a bursting pressure P of 138 bar and a quantity Q of fibres equal to 500 g/m, thus resulting in a ratio Q/P equal to 500/138=3.6 g/m.bar.

The results given above relate to bands, the longitudinal slivers of which are made of aramide, but it goes without saying that optimization within the meaning of the invention could be achieved with slivers of various types, such as carbon, ceramic or glass fibres, for high strength or by means of polyester threads for medium strength.

In general terms, within the meaning of the invention, the leakproof inner tube may be:
 a polymeric tube, for example made of thermoplastic . . .
 a windable metallic tube, for example a corrugated tube;
 a combination of the two.

If the leakproof inner tube is a polymeric tube, the pipe may have the disadvantage of becoming oval and of having a weakness towards an external crushing pressure. This weakness may stem, for example, from the pressure exerted by the equipment for gripping and handling the pipe or from the passage of the pipe over a curved support or from hydrostatic pressure in the event of use in deep water, for example 1000 m.

To overcome this disadvantage, the pipe may comprise, in a way known per se, a flexible tube resistant to crushing, for example a non-leakproof casing made from cramped strip metal or from shaped wire cramped and coiled in a low-pitch spiral. Depending on the use of the pipe, the said tube resistant to crushing may be inside or outside the polymeric layer, depending on the pipe, and respectively of the "rough bore" or "smooth bore" type.

The result of this is that the reinforcement may be in contact directly with the polymeric layer or directly with an intermediate tube, such as, for example, the said flexible tube resistant to crushing.

As regards the protective sheath, this may be of any type, for example a preferably extrudable polymeric sheathing or a winding of a plastic band.

The choice of an extrudable sheath, of a simple band or of adhesive depends on conditions of use.

The main objective of this protective layer is to prevent:
 all kinds of external infiltration capable of damaging the layers of reinforcements and/or all attacks of the mechanical type (abrasion, puncturing) or of the physicochemical type (hydrolysis, photochemical, etc.).

If the flexible pipe is used for transporting gas or multiphase products together with gas, in time the gas may diffuse through the inner tube and may accumulate in the annular space between the outer leakproofing sheath and the layers of reinforcements. Some partial pressure attributable to the diffusion of gas is generated in the annular space. This partial pressure may cause the inner tube to collapse when the latter no longer has any internal pressure or may cause the protective sheath to burst if the thicknesses and resistances of the tube and of the sheath are insufficient.

The annular pressure attributable to the diffusion of the gas may technically be reduced:
 by making ventilation points (evacuating the gas at the connection ends, regular piercing of the protective sheath),
 or by selecting a polymeric material for the protective sheath which is more permeable than that of the inner tube,
 or by using a simple band or one with adhesive as a replacement for the outer leakproofing sheath.

In order to reduce the annular pressure, it is preferable to select materials used for the outer sheath 5 and the inner tube 1, such that their respective coefficients of permeability $K_2$ and $K_1$ are different, with $K_2 > K_1$. Advantageously, the ratio of $K_2/K_1$ must be at least equal to 3, preferably equal to 4. Likewise, thicknesses $e_2$ for the outer sheath 5 and $e_1$ for the inner tube 1 which are different, in particular with $e_2$ below $e_1$, will be selected; for example, the ratio $e_1/e_2$ must be between 3 and 4.

Calculations were carried out in order to determine whether the safety coefficient for particular materials was adhered to.

In a first example, it is proposed to use an identical material for the outer sheath 5 and the inner tube 1, for example a high-density polyethylene of the type PE80, according to the standards NF T 5465 and NF T 5403, with the following parameters:

$e_1 = 3e_2$,
 inner radius of the tube 1 $R_1 = 65.4$ mm,
 outer radius of the sheath 5 $R_2 = 82$ mm,
 internal pressure in the tube 1 Pi=20 bar,
 pressure in the annular space Pa=Pi/4=5 bar The calculations of the stress σ generated in the sheath are greater than the maximum stress allowed (MRS: Maximum Strength Required). Such a solution is unacceptable.

Another example of the materials for the sheath 5 and the tube 1, such as PEBD and DOW 300 PE 32 (a polyethylene material manufactured by the Dow Chemical Co.) respectively, gives a ratio $K_2/K_1$ which is substantially equal to 4 ($K_2=1.4 \times 10^8$ and $K_1 \approx 0.35 \times 10^8$). By selecting $c_1$, $e_2$, $R_1$ and $R_2$ such that $R_2/R_1=1.26$, $e_1/e_2=3$ and a pressure Pa=1.27 bar, a value of σ equal to approximately 2.14 MPa or 21.4 bar is found, this being acceptable. The leakage rate for the pipe would be of the order of $183 \times 10^{-8}$ cm$^3$/S, that is to say of the order of 5.6 m$^3$ for one year and one kilometre of length.

A highly suitable material for the outer sheath 5 is a polyurethane alloy, such as PU ELASTOLLAN 1185 A from the company ELASTOGRAN.

In its simplest version, the pipe may dispense with a protective sheath. It may comprise only a leak-proof tube and a reinforcement based on the band according to the invention. This case may be considered, in particular, with a band made of polyester fibres.

The pipes may be equipped with connection pieces of known type, the ends of the bands being fastened directly to the connection piece, as in the case of metallic reinforcing bands.

According to another embodiment (not shown), the pipe may comprise a reinforcement comprising a band wound at low pitch, for example at 85°, and functioning as a pressure arch resistant to circumferential stresses.

According to yet another embodiment (not shown), the pipe may comprise a tensile reinforcement comprising a plurality of bands coiled spirally around the central axis of the pipe at an angle smaller than 55°, for example 30°. This tensile reinforcement is placed, for example, on a pressure arch.

This pressure arch may advantageously be produced by means of the band of the invention, as mentioned above, or by means of a component made of relatively light material, such as cramped-shaped wire made of aluminium alloy or a profile made of rigid FRP composite material.

Within the meaning of the invention, slivers mean a set or group of continuous threads, twisted or not twisted together, each thread being capable of being a monofilament or a set of continuous or discontinuous fibres or filaments, in particular assembled by twisting or spinning.

Where appropriate, a sliver may be obtained by assembling a plurality of elementary slivers, for example by twisting, or simply by a parallel grouping of a plurality of elementary slivers.

What is claimed is:

1. Flexible pipe for conveying a fluid under high pressure, comprising:

a leakproof inner tube, a reinforcement comprising at least one band wound spirally around a central axis of said inner tube, said band being flat and having at least one layer of longitudinal filamentary twisted or untwisted slivers comprising a loose woven weft, characterized in that the weft is woven with a pitch greater than five times the diameter of thread comprised in the weft, and in that binding material is arranged at least between said filamentary slivers and said weft, the longitudinal slivers being closely packed against one another over their entire length and having a compactness at least equal to 39%.

2. Flexible pipe according to claim 1, characterized in that weakening of the slivers in the band is below 10%.

3. Flexible pipe according to claim 1, characterized in that the reinforcement comprises two superposed laps, each consisting of a plurality of flat bands wound spirally in opposite directions from one lap to the other.

4. Flexible pipe according to claim 1, characterized in that the pitch between two consecutive weft threads is approximately 0.5 cm.

5. Flexible pipe according to claim 1, characterized in that the weft thread is sheathed with thermoplastic.

6. Flexible pipe according to claim 1, characterized in that the longitudinal filamentary slivers comprise fibres or filaments made from aromatic polyamide.

7. Flexible pipe according to claim 6, characterized in that each filamentary sliver is sheathed with thermoplastic.

8. Flexible pipe according to claim 1, characterized in that the weft thread is made from aromatic polyamide fibres.

9. Flexible pipe according to claimclaim 1, characterized in that the weft thread is made from polyester fibres.

10. Flexible pipe according to claim 1, characterized in that it comprises, furthermore, an anti-adhesion band wound, around the last reinforcing lap.

11. Flexible pipe according to claim 1, characterized in that the binding material is below 40% by volume of the flat reinforcing band.

12. Flexible pipe according to claim 1, characterized in that the mean diameter of the weft thread is equal to approximately one third of the diameter of the warp thread.

13. Flexible pipe according to claim 1, characterized in that the leakproof inner tube is a windable metallic tube.

14. Flexible pipe according to claimclaim 1, characterized in that the leakproof inner tube is a polymeric tube.

15. Flexible pipe according to claim 1, characterized in that the reinforcement comprises a band wound spirally at a low pitch.

16. Flexible pipe according to claim 1, comprising, furthermore, a protective outer sheath, characterized in that the outer sheath and the inner tube have respectively coefficients of permeability $K_2$ and $K_1$, such that $K_2 > K1$.

17. Flexible pipe according to claim 16, character the ratio $K_2/K_1$ is greater than 3.

18. Pipe according to claim 1, of the type comprising, furthermore, a protective sheath, characterized in that the protective sheath (5) and the inner tube have respectively thicknesses $e_2$ and $e_1$, such that $e_2$ is below $e_1$, preferably in the ratio $e_1/e_2$ between 3 and 4.

19. Flexible pipe according to claim 16, characterized in that the outer sheath is made of polyurethane and the inner tube of polyethylene.

20. Flexible pipe according to claim 1, wherein the longitudinal slivers have a diameter which is substantially three times said diameter of said weft thread.

\* \* \* \* \*